United States Patent [11] 3,593,120

| [72] | Inventors | Joseph M. Mandula, Jr.<br>Seven Hills;<br>Jack C. Irving, Mentor, both of, Ohio |
|---|---|---|
| [21] | Appl. No. | 829,872 |
| [22] | Filed | June 3, 1969 |
| [45] | Patented | July 13, 1971 |
| [73] | Assignee | Republic Steel Corporation<br>Cleveland, Ohio |

[54] APPARATUS MOVABLE RELATIVE TO AN ARTICLE FOR CARRYING A TESTING PROBE AT THE SURFACE OF THE ARTICLE
26 Claims, 10 Drawing Figs.

[52] U.S. Cl. .................................................. 324/34 R,
 33/174, 73/67.8, 324/37
[51] Int. Cl. ...................................................... G01v 33/00
[50] Field of Search ............................................ 324/34, 37,
 40, 54; 73/67.8, 67.9, 71.5; 33/145, 174

[56] References Cited
UNITED STATES PATENTS
| 2,526,977 | 10/1950 | Smith | 324/37 |
| 3,263,332 | 8/1966 | Plasser et al. | 33/145 |
| 3,327,206 | 6/1967 | Wood et al. | 324/37 |
| 3,361,961 | 1/1968 | Zoellick | 324/37 |

*Primary Examiner*—Rudolph V. Rolinec
*Assistant Examiner*—R. J. Corcoran
*Attorneys*—Robert P. Wright and Joseph W. Malleck

ABSTRACT: A carrier for a testing probe, e.g. for eddy current testing, comprising a yoke having a pair of arms flexibly connected at one end and spanned between their other ends by a chain of rolling members supporting the probe so that by means, e.g. spring loaded, which engages the yoke at its flexible connection, the rolling chain can travel on the surface of an article, and over corners or curves, holding the probe in testing contiguity. Supplemental spring-biased means cooperate in guiding the probe, with articulated structure in the carrier to accommodate other surface irregularity, and means are indicated whereby relative rotation is effected between the article and the carrier about an axis through the article, and likewise relative axial displacement, so that the probe may scan the surface of a billet, cylinder or other article along a helical path.

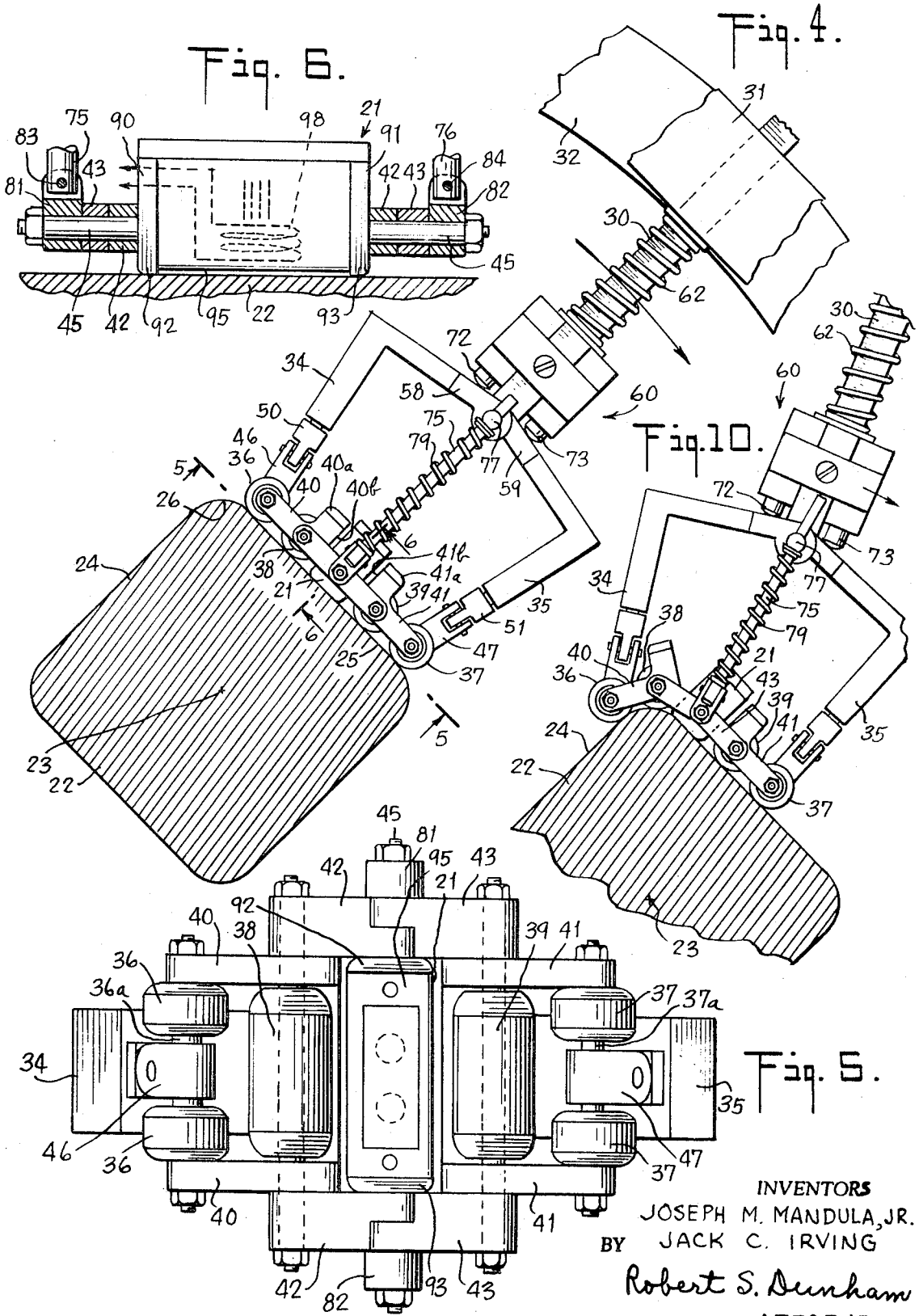

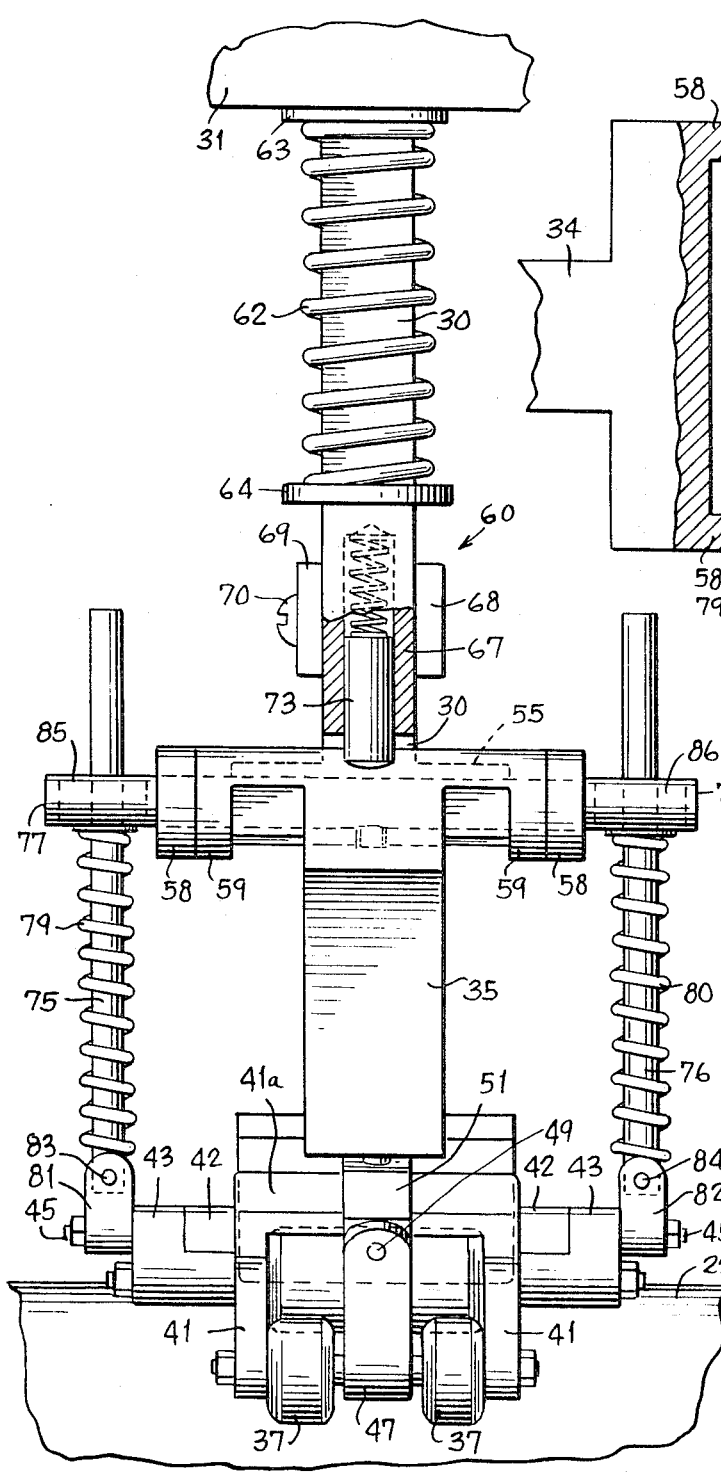
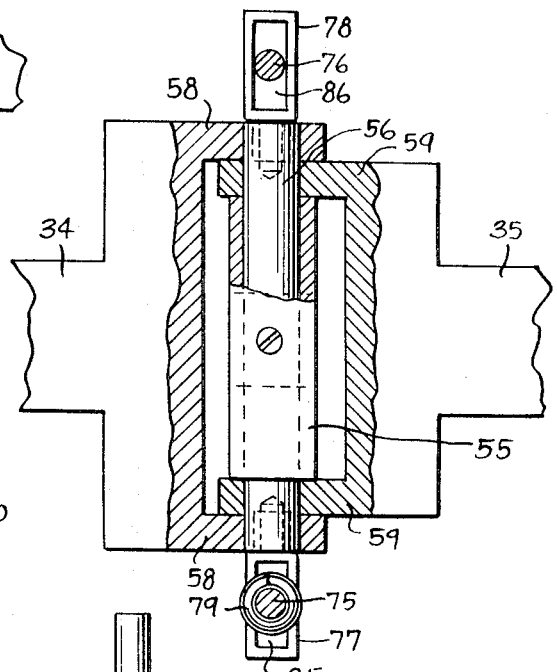
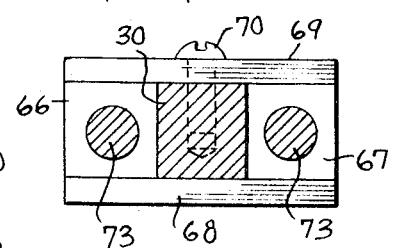

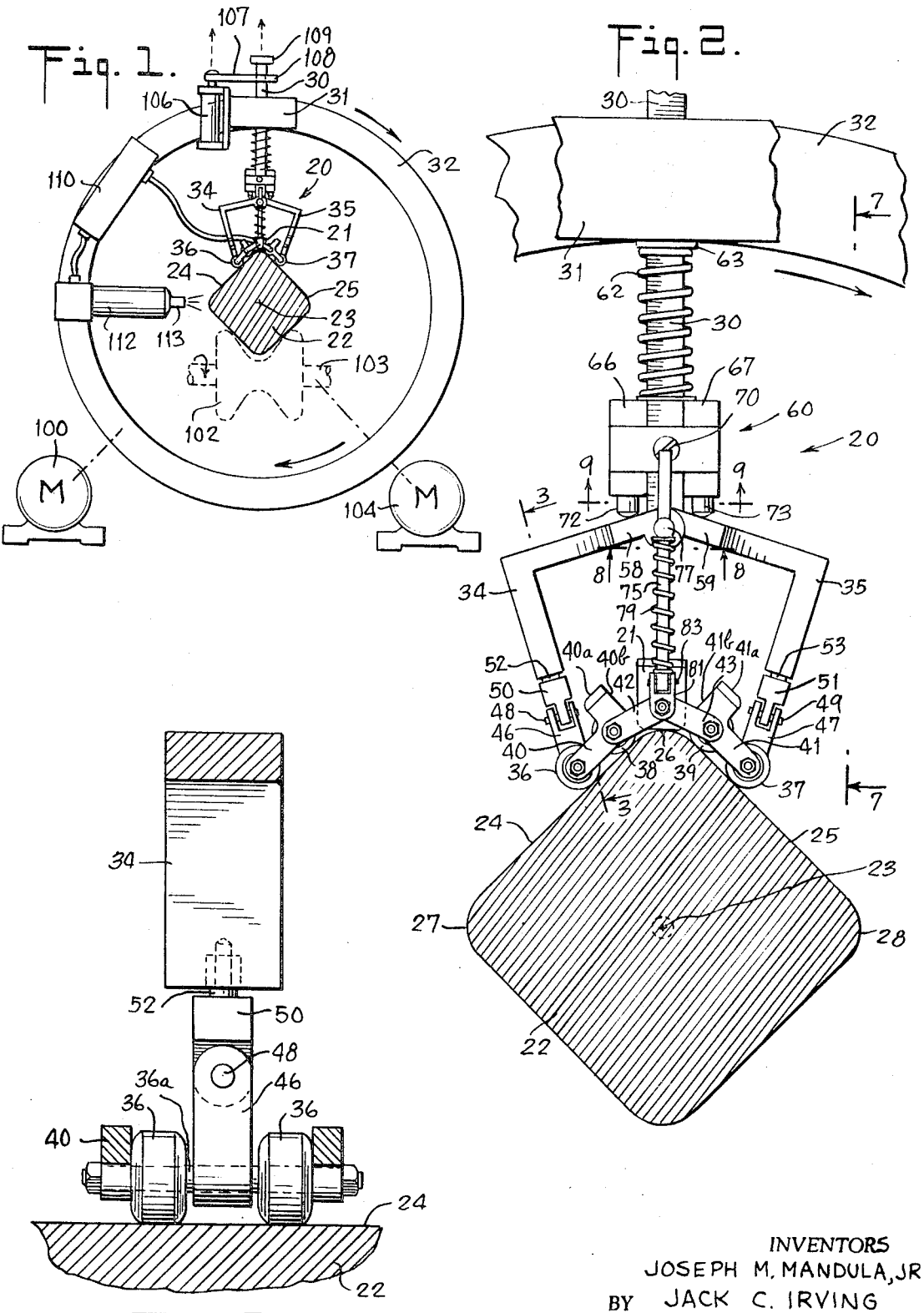

APPARATUS MOVABLE RELATIVE TO AN ARTICLE FOR CARRYING A TESTING PROBE AT THE SURFACE OF THE ARTICLE

BACKGROUND OF THE INVENTION

This invention relates to rotary or other traveling apparatus for inspecting articles having nonplanar surface characteristics, and more particularly is concerned with such apparatus for carrying a testing probe around the surface of an article during relative rotation of the article and carrier about an axis through the article. In a still more particular sense the invention is related to electrical testing, as of the eddy current type, where a sensitive probe is caused to scan the surface of an article along a helical or like path while relative rotation of the probe and article is effected and likewise relative axial displacement.

Although apparatus of the foregoing character, as for inspecting the outer surface of pipe, rods, shafts and other articles of cylindrical contour, have been available or proposed, difficulty is encountered in effecting corresponding inspection throughout the faces of articles that are not bounded by surfaces of revolution, as for example substantially rectangular billets or other articles having a peripheral contour of polygonal or like shape. Whereas devices for scanning the surface of sheet or plate are theoretically adaptable to scan the faces of square-section billets or the like, the operation is cumbersome, in that the faces must be separately inspected and a reciprocating scan of the test head is apt to be mechanically unsatisfactory involving heavy wear or operative unreliability because of reverses of movement. Furthermore, inspection of the corners of the article is not ordinarily practical.

Accordingly a significant primary object of the invention is to provide apparatus of the character described, designed for inspecting, as by an eddy current probe or the like, an article having noncircular sectional contour, wherein relative rotary motion of the probe and article carries the probe, in effect, along a rotary path around the article, maintaining desired inspecting contiguity of the probe and surface. A further object is to provide a probe carrier arranged for flexible conforming engagement with the article surface throughout successive, repetitive changes in surface contour which are presented as the probe is caused to pursue a rotary path relative to the article. A still further object is to provide such apparatus and probe carrier suited to a large variety of surface contours, including circular as well as polygonal shapes, and adapted to afford effective inspection along all surfaces including corners, planes and curved configurations.

SUMMARY OF THE INVENTION

To the above and other ends, the invention comprises a novel probe carrier which may be arranged for disposition at the surface of an article to be inspected, while relative rotary or like motion is produced between the carrier and the article, e.g. about an axis traversing, and preferably approximately centered in the article. More particularly, the probe carrier comprises flexible means readily movable in bearing on the article surface, being advantageously a chain or linkage of rolling members, arranged to engage or embrace a minor portion of the periphery of the article, such chain carrying a testing probe with its sensing face in desired contiguity to the surface while the stated relative movement is effected for causing the probe to scan such surface. The carrier further includes a flexible yoke, specifically a yoke device having a pair of arms respectively at one end connected to the ends of the flexible means, i.e. the roller chain, so that such means spans the arms, and at the other end connected together by pivoting means at a locality spaced outward, e.g. radially outward from the axis of the stated relative rotary movement.

The apparatus further comprises means, preferably including a member reciprocable along a radius of the described axis, approximately passing through said pivoting means, for urging the yoke arms toward the article, i.e. by action of the member on or at the pivoting means, so that the roller chain is caused to engage the article surface and the yoke arms then tend to spread, in effect drawing the ends of the chain outwardly or apart in aid of such engagement, to maintain the probe with its face in testing contiguity during the described relative displacement of the carrier and article. That is to say, a primary function of the yoke, under force applied centrally thereof, is to seat the end-rolling members of the chain against the surface of the article, the pivotal connection of the yoke arms and the flexible nature of the chain coacting to effectuate this result, and also coacting, in response to mechanical reaction of the article against the seated end-rolling members, to draw the chain tight, so to speak, against the intermediate surface portion of the article.

Special, cooperating features of the invention, in presently preferred embodiments, include guide means for the probe element extending in sliding arrangement to the locality of the yoke arm pivot and particularly including spring or like means urging the probe element against the article surface, i.e. relative to the point of application of force to the yoke, such arrangement serving to promote desired contiguity of the probe, especially on plane or nearly plane surface areas of the article.

The entire carrier is advantageously mounted to provide relative rotation of the article and carrier about the described axis while exerting the desired force on the yoke, as by spring or like yieldable means, e.g. to provide optimum accommodation of the probe-carrying flexible assembly with the article surface and with repeated or other successive contour variations around the article. In a generic sense the relative rotation of the carrier and article can be achieved in any way, in that the article may be held while the probe carrier revolves around it, or the probe carrier may be stationary while the article turns, or conceivably both may revolve in opposite directions.

In one notably convenient arrangement the invention comprises apparatus for supporting the probe carrier to be advanced in a rotary path about the article, as on a ring or like structure with appropriate driving means, while the article is advanced axially through such ring, as on appropriate rolls or the like. Marker means can also be included, e.g. for automatically marking localities of detected flaws in the article, such means being likewise carried around the article with the probe mechanism. As a further feature, the carrier can advantageously accommodate at least minor variations of surface in an axial or noncircumferential direction, as by articulated structure of the yoke arms and appropriate angular freedom of motion of the probe guide means, while supplemental spring-loaded elements, bearing on the yoke arms, can be included for keeping the yoke in a partly closed, symmetrical arrangement, as when it is not engaged with the article.

In a special sense the invention is conceived for eddy current testing, wherein the probe embodies a sensing coil or similar electromagnetic means serving to induce eddy currents in the metallic body of the structure at or immediately adjacent the surface—especially for use with steel or other ferrous articles although bodies of other metals are capable of like inspection—and also serving to detect defects or flaws evidenced by departures from a normal eddy current response. In a generic sense, however, the mechanical arrangement of the probe carrier and associated equipment is adapted for other testing, e.g. of electromagnetic character or indeed of any sort, whether involving optical, electrical, nuclear or mechanical contact function, as where the probe must move in contact with or very close to the surface under inspection.

Apparatus of the described character is of special utility in fulfilling the above-stated and other objects, being amply rugged and reliable and being effective to maintain the probe in position at all areas of the article surface, whether flat, curved or at corners, with the further result of affording a rapid, accurate scan of the entire periphery and thus of the entire surface. Still further features of the invention and aspects of its utility are stated or apparent from the accompanying illustration and further description thereof hereinbelow.

BRIEF DESCRIPTION OF THE DRAWINGS

FIG. 1 is a simplified and largely schematic view of complete testing apparatus, showing the probe carrier in front elevation and an article in transverse section with means indicated for moving the carrier around the article;

FIG. 2 is a front elevational view, similar to FIG. 1, showing the probe carrier engaged with the article surface at a corner region of the article, enlarged relative to FIG. 1;

FIG. 3 is a further enlarged section of part of the carrier on line 3–3 of FIG. 2;

FIG. 4 is a view similar to FIG. 2 but showing the carrier advanced to a position abutting a plane face of the article;

FIG. 5 is a view, on the scale of FIG. 3, showing the bottom of the carrier as on line 5–5 of FIG. 4;

FIG. 6 is a fragmentary section on line 6–6 of FIG. 4;

FIG. 7 is a side elevation of the carrier, with a part broken away in section, as seen on line 7–7 of FIG. 2;

FIG. 8 is a fragmentary view on line 8–8 of FIG. 2, but with certain portions broken away in horizontal section;

FIG. 9 is a section on line 9–9 of the central structure in FIG. 2; and

FIG. 10 is a view similar to FIGS. 2 and 4, but showing the carrier at an intermediate position in its path of revolution.

DETAILED DESCRIPTION

Referring first to FIGS. 1 and 2, the probe carrier assembly 20 is generally arranged to carry a probe 21 around and preferably in contact with the surface of an article 22, here shown as a rectangular steel or other metal billet, of considerable length (see FIG. 7) along its axis 23, which has four plane faces as at 24, 25 and four corners, e.g. of rounded contour, as at 26, 27 and 28. The probe carrier is supported and operated by a square shaft 30 that slides, radially of the article, in a suitable square bearing (not shown) in a mounting block 31 that may be secured to a ring or like structure 32 so as to move the assembly in a path of revolution about the article 22, i.e. concentric with the axis 23.

With reference more generally to FIGS. 2 to 9 inclusive, the search probe assembly 20 includes a modified roller chain that is held to the surface of the billet 22 and supported by a flexible yoke comprising a pair of arms 34, 35. The roller chain (FIGS. 2 to 7) comprises end rollers 36, 37 and intermediate rollers or rolls 38, 39, respectively disposed on opposite sides of the probe element 21, all free to turn on their shafts and arranged in chain relation by freely pivoting linkage. Such linkage, conveniently constituted by pairs of links at the outer ends of the roller shafts, includes yoke links 40, 41 respectively connecting the end rolls 36, 37 with the intermediate rolls 38 and 39, and center links 42, 43 mutually pivoted on a shaft at 45 carried by the probe 21 and respectively linking the rolls 38 and 39 with the probe. While conceivably a roller chain having fewer or greater numbers of links and rolling members may be employed, a four-element chain of the character shown, modified by inclusion of the probe itself as a fifth or central bearing element, is of special advantage, being particularly suited to accommodation with noncircular contours (i.e. with at least two rolling elements on each side of the probe) and yet adapted for a variety of such surfaces without undue mechanical complexity. The yoke arms 34, 35 are freely pivoted at their lower ends to the shafts 36a, 37a of the rollers 36, 37 respectively by elements 46, 47.

Each of these elements 46, 47 is preferably shaped as a clevis at its upper end, for pivotal connection, respectively at 48, 49, with swivel eye elements 50, 51 that are in turn carried in the superposed portions of the arms 34, 35 by swivel connections 52, 53. Thus the swivel connections permit the lower elements 50, 46, and 51, 47 to swivel about an axis longitudinal of the arms, while the eye and clevis assemblies permit a rocking connection at the pivot axes 48, 49, thereby affording an articulated joint in each yoke arm, to function as described below.

The lower end of the square supporting and operating shaft 30, which can slide longitudinally but cannot rotate, carries a transverse, centrally bored or hollow portion 55, i.e. so that the complete structural form of the shaft 30 resembles an inverted T (FIGS. 7 and 8). Through the center of the transverse part 55 of the T, a shaft 57 extends, being advantageously fixed in the element 55 and having projecting end portions that serve for rotatable support of pairs of clevis arms 58, 58 and 59, 59 respectively extending from the upper, contiguous ends of the yoke arms 34, 35. The described assembly thus constitutes pivoting means for rocking or pivotal support and connection of the upper ends of the yoke arms, preferably on a mutual pivot axis constituted by the shaft 56, whereby the yoke arms can rock about the shaft and downward force on the ends of the arms can be exerted by the T-shaft 30, i.e. in effect on or at the pivoting means. A block or plunger assembly 60 is secured to the square upright portion of the T-shaft 30 at a locality near the pivot shaft 56, and a spring 62, under compression as between the upper end of the plunger assembly 60 and the lower face of the supporting block 31, forces the entire probe carrier, including the roller chain assembly, against the surface of the billet or other article.

The spring 62, which may be a suitably powerful coil spring surrounding the square shaft 30, is shown as conveniently held between upper and lower washers or plates 63, 64, which in turn form actual abutment with the block 31 and plunger 60. The structure 60, which may conveniently comprise a welded assembly of two side blocks 66, 67 and lapping plates 68, 69, attached to the shaft 30 by a screw 70, carries a pair of downwardly projecting spring-loaded rods 72, 73 that respectively bear upon the upper faces of the arms 34, 35, for stabilizing and prepositioning function as explained below.

A pair of guide rods 75, 76 extend upwardly from the outer ends of the probe shaft 45 through slotted members 77, 78 at the ends of the yoke pivot shaft 56, and respectively carry springs 79, 80, under compression, which are preferably small relative to the major spring element 62. The rods 75, 76 are connected to the probe shaft 45 by clevises 81, 82 which are pivoted to the lower ends of the rods by clevis pins 83, 84 and are each free to turn on the probe shaft 45. Thus the rods 75, 76 can rock about the probe shaft and may also rock in upright planes that pass through the shaft, i.e. about the clevis pins 83, 84. At their upper portions the rods slide in vertically open slots 85, 86 in the pivot members 77, 78, such slots extending longitudinally, i.e. axially of the latter members, to accommodate rocking movement of the rods 75, 76 about the clevis pins 83, 84. The slotted members 77, 78 are pivotally secured at the ends of the shaft 56, i.e. so as to be free to turn but not move axially of the shaft. The springs 79, 80 respectively compressed between member 77 and clevis 81 on one rod and member 78 and clevis 82 on the other rod coact in holding the probe, i.e. the center of the roller chain against the billet surface, while the freedom of rocking movement of the guide rods 75, 76 about the clevis pins 83, 84 provides articulation coacting with that of the yoke arms 34, 35.

The probe element 21 may assume any configuration appropriate to its function, and although in some cases may itself include rolling means bearing on the article surface, is here shown as having a pair of wear shoes 90, 91, in the form of plates at its ends, to provide bearing surfaces 92, 93 for abutting contact with the surface of the article 22, the main, intermediate lower face 95 of the probe thus being held above such surface by a very small distance, although in effect in contact or more generally appropriate contiguity for the inspecting or searching function of the probe. It will be understood that this complete element, here shown as of generally rectangular or boxlike form, may include the necessary electrical or electromagnetic instrumentality such as the search coil 98, also represented by core poles 99, the nature of this coil or like element, as well as its electrically responsive circuit for inducing eddy currents in the surface or surface regions of the article and for detecting abnormalities of such eddy currents, being of any suitable type as will now be understood, although preferably of a type responsive to surface conditions.

Although the rolling members carried by the chain or linkage for travel on the article surface can be of other shape, and indeed can advantageously for some purposes take the form of ball casters or like elements, the rolls or rollers shown at 36 to 39 inclusive are effective, and can be either single roller elements as at 38 or pairs of rollers as utilized at 36, 36 to accommodate the clevis end of the yoke arm 34 at a central locality of the axle 36a. The end links 40 are advantageously embodied in the form of a yoke, i.e. the two side arms being joined by a transverse bridge portion 40a which is disposed above the roller 38 and provides, in effect, a wall or edge 40b adjacent the side face of the probe element 21. The links 41 at the other side include a like bridging yoke 41a and face 41b, a function of these faces being to assist in maintaining desired position of the probe unit, i.e. so that it does not by chance rock too far about its axis so as to become out of position for automatic seating on the surface of the article.

As explained, it is normally intended that the probe assembly be employed by effecting relative rotary movement between it and the article, references generally herein to such relative movement or to relative travel of the probe assembly along or around the surface of the article being intended (unless otherwise specifically stated or clearly apparent) to signify generically any condition of such relative motion, whether the article or the probe carrier is stationary while the other actually moves or indeed whether both may move in opposite directions.

The mechanical function of the structure, particularly in FIGS. 2 to 10 inclusive, is essentially implicit in the foregoing description. Assuming, for example, that the block 31 is carried by a ring 32 which revolves around the article 22 in clockwise direction as indicated by the arrows, and that the assembly is allowed to move, under the influence of the spring 62 into engagement of the roller chain system with the surface of the square-section billet that happens to be positioned with a rounded corner 26 uppermost, i.e. aligned with the vertical axis of the shaft 30, the arrangement of the parts is such that the roller chain will engage the billet surface as shown in FIG. 2. The downward force of the shaft 30, exerted on the pivot means for the flexible yoke, and thus on both arms 34, 35 of the yoke, brings the ends of the chain, specifically the rollers 36 and 37, against the faces 24 and 25 of the billet, the flexible nature of the chain and the linked connection of the arms permitting this action, while at the same time coacting, upon such abutment of rollers 36, 37, to draw the entire chain against the billet surface, including the corner portion, i.e. by virtue of a then-arising component of the downward force which in effect tends to spread the yoke arms 34 and 35. Hence the roller chain fully embraces the surface portion, which is a minor part of the total billet circumference, and carries the probe into like contact, i.e. of its wear shoes 92, 93.

FIG. 4 shows the parts after advance to a flat or plane face 25 of the billet, the rollers and the underside of the probe all again being in contact with the surface, likewise by virtue of the same effect of downward force, through the yoke, on the ends of the chain and the like tendency of a spreading component of such force to draw the chain tight. In all cases the supplemental springs 79 and 80, on the guide rods extending from the probe mounting shaft 45, coact in ensuring seating of the probe for desired contiguity of its sensing face 95, this supplemental function being of special significance when the assembly is traversing a flat surface as in FIG. 4, as the stretching or chain-tightening function of the yoke then affords little or no component of force toward the surface at the center of the chain.

FIG. 10 illustrates, diagrammatically, the location of the elements at a position intermediate those of FIGS. 2 and 4, i.e. as the probe carrier has begun to move beyond the position of FIG. 2, toward the position of FIG. 4. Here it will be seen that all of the rollers again are automatically brought into full contact with the billet surface, the trailing roller 36 remaining on the surface 24 and the next roller 38 being at the corner while the two leading rollers 37, 39 have advanced to the surface 25, and likewise the probe 21. The latter device, with its searching face 95 essentially flatwise on the billet surface 25, is situated in an angular position relative to the axis of the shaft 30 through the center 23 of the billet, and the guide rod 75 is likewise rocked, about its end pivots, into a different angular departure from the axis of shaft 30. These several angular relationships provide the desired self-accommodation of the probe to the surface, being permitted by the pivotal support and connections among the chain linkage, the probe, the guide rod and the upper sliding support of the latter.

From the exemplified positions of FIGS. 2, 10 and 4, it is manifest that throughout the path of travel of the probe carrier around the billet 22 the shaft member 30, acting under the force of the spring 62 exerts corresponding force on the yoke arms 34, 35, i.e. at their mutual pivot shaft 56, in a direction toward the surface of the billet. The end rollers 36, 37 of the chain are thereby kept in continuing engagement with the billet surface and furthermore the chain is continually drawn around and against the surface so that the remainder of the bearing elements, including the rollers 38, 39 and the probe element 21 are likewise maintained in seated relation. This condition of the assembly perseveres through all of the relative positions of the carrier and article, with resulting, desired continuous inspection of the article surface by the probe while the latter is held in significantly constant contiguity for corresponding uniformity of sensing function.

The rocking nature of the probe and of its guide rod 75 coacts, as apparent from FIG. 10, in maintaining the desired probe position during times when the surface contour of the billet is nonsymmetrically disposed relative to the roller chain. The spring-loaded pins 72, 73 coact with a stabilizing or aligning function, i.e. in that they tend to bias each yoke arm individually toward the article under inspection, and thus, for example as a corner is turned, promote the radially inward movement of the leading roller and likewise the radially inward positioning of a trailing roller shortly before the device passes from a corner completely onto a flat surface. Moreover, these spring-loaded pins tend to stabilize the parts when no article is present, e.g. in a position appropriate for rapid, desired seating on the surface of an article, with the axes of the guide rods 75 and 76 coplanar with the T-shaft 30.

The articulated nature of the lower parts of the yoke arms 34 and 35, including the elements 46—50 and 47—51, allows accommodation of the device to irregular surface conditions of the billet or other article, e.g. irregularities in a direction otherwise in the plane of the path of revolution. Thus somewhat larger sections or irregularly larger sections of the article can be accommodated, or in particular the surface of a crooked billet can be appropriately and effectively scanned, even though such surface is not parallel to the normal centerline. In doing so, the several parts of the roller chain can in effect rock somewhat relative to others and the yoke and can rock considerably, together, while the similarly permitted rocking movement of the guide rods 75, 76 in the slots 85, 86 cooperates in affording these angular displacements. Hence the probe is enabled to maintain the desired inspecting position regardless of twisted or other crooked configuration of the billet, or bumps or other irregularities, or even minor changes in diameter or dimension, during the twofold relative motion for scanning, namely the travel of the probe in revolution and the axial advancement of the billet.

Although it is conceived that a plurality of probe carriers may be utilized simultaneously, e.g. to scan parallel interlaced helical paths around the article, as with the probes disposed at two or more angularly spaced positions which are mutually displaced by appropriate small distances in the axial direction of the article, effective results are attainable with a single carrier and probe, as shown by way of example in FIG. 1. This view shows in essentially schematic manner and with highly simplified structure and arrangement of parts for purposes of illustration, a machine for moving the probe carrier around the billet or other article while the latter is advanced axially, i.e. in a direction perpendicular to the plane of the drawing, it being understood that in practice other and more elaborate instrumentalities may be employed for the several functions, with supporting, bearing and driving connections not here detailed.

Thus in FIG. 1 it will be understood that the ring 32, concentric with the axis 23 of billet travel, is arranged to be turned around such axis continuously by appropriate driving means indicated by the motor 100. Likewise the billet 22 is advanced slowly in a longitudinal direction, i.e. along its axis 23 by suitable rolls or other guiding or advancing means, here simply illustrated by the V-roll 102, which cradles the billet 22 and is rotated on its horizontal shaft 103 by driving means indicated as the motor 104. The probe carrier 20 mounted at the lower end of the square shaft 30 that slides vertically through the block 31 affixed to the ring 32, is preferably accompanied by means for displacing and holding the carrier away from the path of the article 22, e.g. at times when no article is present. Such means is here shown for simplicity of illustration as a device 106 (e.g. operated manually, electrically, by fluid or otherwise) carried with the block 31 and adapted to move an element, for example an arm 107, from a lower position as shown to an elevated location where the arm, past or through which the shaft 30 is free to pass at 108, has engaged a flange or head 109 on the shaft 30 and moved the latter upward so that the carrier is fully clear of the billet. Thus removal and insertion of articles is facilitated, and when the billet is in place the arm 107 or the like is retracted to the illustrated position, leaving appropriate freedom of vertical motion of the shaft 30, i.e. upward or downward as may be necessary, although in point of fact with the illustrated configuration of the yoke and roller chain of the carrier, there may be little or no actual movement of the plunger 60 relative to the block 31.

If desired, electrical means associated with and responsive to the inspecting function of the probe 21 may be arranged to travel with the probe carrier and to actuate a marking device for registering, directly on the article, the occurrence of detected defects or flaws, such marking device likewise traveling with the probe. Thus simply for illustration, suitable electronic or like instrumentalities in a housing 110 secured on the ring 32 are electrically connected to the probe 21 and will be understood to provide the necessary high frequency AC signal or other current supply to the probe, as well as to effectuate readings of, or other response to, detected electrical effects, e.g. modifications of the current to the probe, or other detectable signals, that represent flaws or defects in or below the surface of the billet which the probe is inspecting. A suitable paint spray or other marking device 112 is, likewise for purposes of illustration, shown carried by the ring 32 having a nozzle 113 whereby a momentary jet of such marking fluid may be projected on the surface of the billet. As will be readily understood, the marking device 112 is controlled by the electrical means 110, advantageously in timed relation with the rotational velocity of the ring and probe carrier, so that if the probe detects a flaw or defect at a given spot, the device 112 will automatically project a mark of paint or the like upon that precise spot as the ring carries the device past.

The operation of apparatus such as schematically shown in FIG. 1 will be self-evident. Assuming that the probe carrier has been raised by the means 106—107, the billet 22 is inserted in position for commencement of probe scanning at the leading end thereof, and the cylinder 106 is operated to lower the probe against the billet surface, whereupon the roller chain of the carrier automatically moves into conformity therewith, as shown and previously illustrated. The ring 32 is set in motion for revolution of the probe carrier around the billet, while the advance of the billet, e.g. forwardly from the plane of the drawing, is initiated, the electrical system of the probe being also brought into operation. Thereupon the probe in effect follows a helical path around the article, so that the entire surface of the latter is progressively scanned, the rate of axial advance of the billet being set or adjusted so that the successive scanning revolutions of the probe appropriately cover the entire surface.

The carrier, as explained above, functions automatically to keep the probe in a desired sensing position, i.e. desired contiguity, at all times, it being further noted that in the preferred construction of the carrier, the probe is self-seating or self-positioning, i.e. by virtue of its pivotal support in the linkage of the chain, so that it can rock essentially independently of the chain links and maintain squarely seated abutment on its lower parts, e.g. the wear shoes 92 and 93, at all times. The coaction of the flexible yoke and the flexible means spanning the arms of the yoke, effectively keeps the carrier in contiguity with the billet surface, whether on flat, curved or other convex contours thereof. The elements such as the springs 79, 80 coact in maintaining the firm but appropriately sliding engagement of the probe, especially along flat surfaces, and indeed may advantageously provide for entry of the probe into areas of slight concavity.

The carrier is entirely rugged and reliable, providing accurate, sensitive inspection of the entire surface of the article in a smooth, continuous manner, and at regions of high convexity, such as corners, as well as flat or curved faces. All parts that come into actual contact with the test surface may be readily fashioned of wear-resistant material, e.g. appropriately selected and treated steel for the several rollers and wear shoes, and there is an essential minimum of parts.

Relatively sharp corners can be traversed, as for example corners curved with a radius as small as one-fourth inch on billets having a side width of the order of 5 inches, it being understood that with appropriate selection of roller size and arrangement sharper corners or other extreme variations in contour may be accommodated. Rapid reversals of movement can be avoided, thus reducing mechanical abuse on the test head, while the entire moving assembly, e.g. the carrier and probe, may be relatively light in weight so as to permit a high speed of revolution and correspondingly of testing. It will be noted too, that especially with the radial position of the plunger 60 substantially constant, effects of changing centrifugal force are obviated, and by virtue of all cooperating features of the device a very high uniformity of testing function is achieved, i.e. as a result of what is essentially uniform and entirely continuous, intimate contact of the probe.

It is to be understood that the invention is not limited to the particular structures herein shown and described but may be embodied in other forms without departure from its spirit.

We claim:

1. Apparatus comprising a probe carrier for testing an article during relative movement of the carrier around the surface of the article with respect to an axis through the article, said probe carrier comprising a flexible yoke having a pair of arms that are normally spaced apart at their outer ends and movable relative to each other about a central locality of the yoke, said yoke being disposed with said locality thereof remotely spaced from the surface of the article and with said arms projecting toward the article surface and spaced apart as aforesaid in the direction of said relative movement, flexible means spanning the arms between their said outer ends and arranged to flexibly engage said surface, at a plurality of localities distributed along said flexible means at and between its ends, said flexible means, along and within its span, providing flexible bearing contact with said surface, for movably seating on said surface in conformity with convexity thereof intermediate the ends of the yoke, a testing probe carried by said flexible means intermediate its ends in predetermined testing position relative to said surface for inspecting the surface, and means engaging the yoke at said locality thereof for urging the arms against the article to hold said flexible means against the surface with the probe in said testing position.

2. Apparatus as defined in claim 1, which includes means connected with the probe for biasing the same toward the surface relative to the yoke at said locality thereof, to coact with said yoke-engaging means in maintaining the probe in testing position.

3. Apparatus as defined in claim 1, in which said yoke-engaging means comprises a member guided in a direction substantially radially of the aforesaid axis, and associated spring means acting in said direction to urge the yoke toward the article.

4. Apparatus as defined in claim 1, which includes means for supporting the article and for advancing same along the aforesaid axis which extends substantially centrally of the article, and means upon which said probe carrier is mounted in position for engagement of said flexible means and probe with the surface of the article as supported by the supporting means, for advancing said probe carrier along a path of revolution about said axis.

5. Apparatus as defined in claim 1: which includes means connected with the probe for biasing the same toward the surface relative to the yoke at said locality thereof, to coact with said yoke-engaging means in maintaining the probe in testing position, means for supporting the article and for advancing same along the aforesaid axis which extends substantially centrally of the article, and means upon which said probe carrier is mounted in position for engagement of said flexible means and probe with the surface of the article as supported by the supporting means, for advancing said probe carrier along a path of revolution about said axis; and in which said yoke-engaging means comprises a member guided in a direction substantially radially of the aforesaid axis, and associated spring means acting in said direction to urge the yoke toward the article, and said yoke arms include flexible structure allowing the outer ends of said arms to rock in directions crosswise of said path of revolution, to allow said flexible means to follow surface regions of the article that are nonparallel with said predetermined axis.

6. In a probe carrier for testing the surface of an article during relative movement of the carrier and the article, in combination, a yoke comprising arms having a flexible connection between them at one end, a series of links flexibly connecting and extending between the other ends of said arms and having rolling members to seat on the article surface when the yoke is urged against the article, a testing probe carried by the links at a position spaced between the arms, for testing inspection of the surface, and means acting adjacent said flexible connection, to exert force on the yoke toward the article, for urging said roller members against the surface and holding the probe in testing position at the surface.

7. Apparatus which comprises: a probe carrier for testing the surface of an article during relative movement of the carrier and the article, comprising a yoke comprising arms having a flexible connection between them at one end, a series of links flexibly connecting the other ends of said arms and having rolling members to seat on the article, a testing probe carried by the links, and means acting adjacent said flexible connection, to exert force on the yoke toward the article, for urging said roller members against the surface and holding the probe in testing position; first means for supporting an article to be tested, second means for supporting the probe carrier in position for engagement of said roller members with the article supported by said first supporting means so that upon relative rotation between the probe carrier and the article about a predetermined axis the probe is caused to follow a path around the surface of the article, means comprising rotating means and linear advancing means, cooperating with said first and second supporting means, for moving at least one of said article and carrier relative to the other to provide relative advance of the probe carrier in a helical path coaxial with said axis, with the probe held in testing position at the article surface by the carrier.

8. In a probe carrier for testing the surface of an article during relative movement of the carrier and the article, in combination, a testing probe to follow the surface of the article, a chain of rolling members carrying the probe intermediate the ends of the chain, said chain being adapted for seating of the rolling members on the surface of the article as said relative movement carries the chain along a path on the article, a yoke having arms respectively extending to the ends of the chain from a locality spaced above an intermediate region of the chain and means pivotally connecting said arms at said locality, and means engaging the yoke adjacent said pivot means for exerting force on the yoke toward the article and in a direction to spread the yoke when the ends of chain are seated on the article, to hold the rolling members and the testing probe at the surface of the article.

9. A probe carrier as defined in claim 8, in which the chain comprises a pair of end links respectively pivoted at one end to the arms of the yoke, and center links pivoted at one end to each other and at their other ends respectively pivoted to the other ends of the end links, said rolling members comprising rollers at the pivots of the end links to the arms and rollers at the pivots between the end and center links, said probe being carried at the pivot between the center links.

10. A probe carrier as defined in claim 9, in which the probe is pivotally mounted at said center link pivot, to rock about the axis of said pivot, said probe having a face to abut the surface of the article.

11. A probe carrier as defined in claim 10, which includes guide means pivoted at the aforesaid pivot axis of the center links and probe, extending to the locality of the pivot means of the yoke arms, said guide means having slidable supporting means at said locality, pivoting about the axis of the said yoke pivot means, and means associated with said guide means for biasing the probe toward the surface of the article relative to the pivot means of the yoke.

12. A probe carrier as defined in claim 11, in which said yoke-engaging means comprises guide means extending from said yoke pivot means in a direction away from the article and spring means associated with said last-mentioned guide means for exerting force on the pivot means of the yoke.

13. A probe carrier as defined in claim 8, in which said pivot means between the yoke arms includes shaft means for pivoting said arms together about a common axis, and said yoke-engaging means includes a member connected with said shaft means and extending from the yoke in a direction away from the article, and spring means associated with said member for exerting force on said shaft means.

14. A probe carrier as defined in claim 13, which includes a mounting structure through which said member extends, being slidable therein to provide freedom of movement of the probe carrier toward the article surface, the aforesaid spring means extending to said mounting means.

15. A probe carrier as defined in claim 14, in which said member includes abutment structure carried thereon adjacent the yoke means, said spring means comprising a spring under compression between said abutment means and said mounting means.

16. A probe carrier as defined in claim 15, in which said yoke arms include portions extending outwardly beneath said abutment means from the yoke pivot means, said abutment means carrying spring-loaded members biased into engagement with said yoke arm portions respectively, for biasing said yoke arms toward each other to limit mutual spread of said arms.

17. A probe carrier as defined in claim 8, which includes longitudinally slidable guide means pivoted at one end to the probe and at the other end at the pivot means of the yoke, and spring means associated with said guide means for urging the probe toward the article surface relative to the pivot means of the yoke.

18. A probe carrier as defined in claim 17, in which said guide means includes articulating means for permitting the chain to rock crosswise with said probe, said guide means being mounted at said yoke pivot means with freedom of crosswise movement to accommodate said rocking of the chain.

19. A probe carrier as defined in claim 18, in which the yoke arms include articulating means, allowing the ends of the chain to rock crosswise, said articulated means of the yoke arms and of the probe guide means coacting to permit accommodation of the chain to departures of surface contour of the article from uniformity in directions crosswise of the path of the aforesaid relative movement.

20. A probe carrier as defined in claim 8, which includes articulating means in each of the yoke arms arranged for rocking movement of the ends of the chain crosswise of the path of the rolling members, to accommodate nonregularity of surface contour of the article.

21. Apparatus comprising a probe carrier as defined in claim 8, means including rotatable structure, for holding said probe carrier and the article while effecting relative rotation thereof between said carrier and article so that the testing probe circumferentially scans the article surface about a predetermined axis, and means including linear advancing means, for effecting relative movement of the article and the carrier in a direction extending longitudinally of said axis.

22. Apparatus comprising a probe carrier as defined in claim 8, means for supporting the article and for advancing same along an axis which extends substantially centrally of the article, and means upon which said probe carrier is mounted for engagement of said chain and probe with the surface of the article as supported by the supporting means, for advancing said probe carrier along a path of revolution about said axis, whereby the probe scans the article surface along a helical path.

23. Apparatus as defined in claim 22, in which the yoke-engaging means of the probe carrier comprises a member connected with and extending from the pivot means of the yoke in a direction away from the article, mounting and guiding means through which said member slides, and spring means under compression between the mounting means and the pivot means of the yoke, for urging the yoke pivot means toward the surface of the article, said probe-carrier-advancing means comprising structure spaced from the locality of the article and moving in a circular path around the article, said mounting and guiding means for the aforesaid member being carried by said last-mentioned structure.

24. Apparatus as defined in claim 23, which includes means associated with said structure movable about the article and having connecting means engageable with said member that extends from the yoke pivot means, for alternatively displacing the probe carrier away from the surface of the article and releasing the probe carrier to abut said surface.

25. Apparatus comprising a probe carrier for testing an article during relative rotative movement of the carrier around the surface of the article with respect to an axis approximately centered in the article, said probe carrier comprising a chain of rolling members arranged for seating of said members on the surface of the article as said relative movement carries the chain around the article, a testing probe having a face to follow said surface and pivotally carried in said chain, intermediate the ends of the chain, for self-positioning of the probe in predetermined testing contiguity of said face with said surface, a yoke comprising a pair of arms respectively extending to the ends of the chain and means pivotally connecting said arms at the other ends thereof at a locality remotely spaced from the chain radially outward of said axis, and means including an element movable radially of said axis and engaging the yoke at said pivoting means, for urging said yoke radially inward toward the article to urge the chain into seating of the rolling members on the surface of the article for holding the testing probe with its aforesaid face in said contiguity with the surface.

26. Apparatus as defined in claim 25: in which said chain comprises end rolling members respectively at the ends of the chain, intermediate rolling members respectively between the end rolling members and the probe, and links from the probe to the ends of the chain, successively connecting the rolling members; in which said yoke-urging means includes means yieldably exerting force on said element toward the article, said yoke being constructed and arranged for biasing said arms to be spread by said force when the end rolling members engage the surface of the article; and which includes means acting against the yoke at its pivoting means for yieldably urging the probe into said contiguity with the article surface.